UNITED STATES PATENT OFFICE.

ALEXANDER BERTRAM, OF TORONTO, ONTARIO, CANADA.

PROCESS OF MANUFACTURE OF MATERIALS FOR THE SURFACE COATING OF WALLS.

1,051,857.  Specification of Letters Patent.  Patented Feb. 4, 1913.

No Drawing.  Application filed September 25, 1908. Serial No. 454,788.

*To all whom it may concern:*

Be it known that I, ALEXANDER BERTRAM, a subject of the King of Great Britain, and resident of the city of Toronto, county of York, Province of Ontario, in the Dominion of Canada, have invented certain new and useful Improvements in Processes of Manufacture of Materials for the Surface Coating of Walls, of which the following is a specification.

The invention relates to a process of manufacture of materials for the surface coating of walls, and the object of the invention is to provide a cement of the gypsum class having satisfactory retarding as well as good binding and hardening properties, and whereby a nice smooth finishing coat may be given to a wall or ceiling, or a rough coat, according to the particular form of the composition used, and it consists essentially in the novel mixture and chemical combination of ingredients in or about the proportions named, as described in the present specification and particularly pointed out in the claim.

The base of the mixture is composed of a carbohydrate, such as sugar, beets, or other sugar containing substances preferably associated in chemical combination with lime and forming a new substance or compound, a carbohydrate of lime.

In forming the base the carbohydrate and the lime are mixed together and then dissolved in water, or the sugar may be dissolved in water and the lime added thereto. The ingredients thus mixed together unite chemically and form a carbohydrate of lime. In place of using water to dissolve the carbohydrate, milk may be used either in the form of skimmed milk, curds or whey, or curds and whey together, and again it may be that, in some cases, the milk itself will be sufficient to mix with the lime to form said base, as it contains a large percentage of sugar. The carbohydrate of lime thus formed is allowed to dry and forms a hard mass which is ground to a fine powder. This powder is mixed with calcined gypsum or plaster of Paris, the preferable proportion being from one to ten of the base to one hundred of the gypsum, according to the strength of the cement required. These ingredients are thoroughly mixed in their dry state and form the "neat" cement.

The "neat" cement is used for forming "finishing" plaster coats and is simply mixed with water to the desired consistency applied with a trowel or other tool in the usual way. The retarding properties of the base holds the gypsum in suspension, allowing it to be worked properly and the binding and hardening properties co-act with the gypsum in setting, to form a hard smooth surface. The cement may be used in forming a rough plaster coat by mixing it with sand in any desired proportion in the same manner that Portland cement is used, bringing it to a plastic state with water in a desired proportion. The "neat" cement may be mixed thin with water so that it can be applied to the surface of a wall with a brush and may be colored or not as desired, thus forming a first class calcimine which will dry with a hard smooth finished surface. A calcimine formed with a carbohydrate of lime as described is very effective, as the lime which may be contained in a wall coating to be covered by the calcimine, will not affect the said calcimine as glue calcimines are affected, that is to say, the lime in the wall coating cannot effect a chemical change in the calcimine whose base is formed partly of lime.

Other ingredients may be used to take the place of the sugar or milk ingredients mentioned. Sugar beets may be ground into a pulp and lime added. The chemical action of the lime preserves and solidifies the beet pulp and when thoroughly dried out, the hardened substance may be ground up and mixed with the calcined gypsum.

What I claim as my invention is:—

A process of manufacture of materials for the surface coating of walls, consisting in first mechanically mixing together a ground carbohydrate and lime, then wetting the same and causing a chemical union to form carbohydrate of lime, then drying and grinding the dried mixture, and then mechanically mixing the ground base with gypsum in suitable proportions prior to the wetting of same, and finally mixing a suitable quantity of water into the dry mixture.

Signed at the city of Toronto, county of York, Province of Ontario, in the Dominion of Canada this 19th day of September 1908.

ALEXANDER BERTRAM.

Witnesses:
H. DENNISON,
E. HERON.